(12) United States Patent
Voellmann et al.

(10) Patent No.: US 8,489,725 B2
(45) Date of Patent: Jul. 16, 2013

(54) PERSISTING FILE SYSTEM INFORMATION ON MOBILE DEVICES

(75) Inventors: Frank Voellmann, Acton, MA (US); Nicole Pigeon, Pelham, NH (US); Carl Chandler Fristrom, Watertown, MA (US)

(73) Assignee: Research In Motion Limited, Waterloo (CA)

( * ) Notice: Subject to any disclaimer, the term of this patent is extended or adjusted under 35 U.S.C. 154(b) by 257 days.

(21) Appl. No.: 12/940,660

(22) Filed: Nov. 5, 2010

(65) Prior Publication Data

US 2012/0016976 A1    Jan. 19, 2012

Related U.S. Application Data

(60) Provisional application No. 61/364,883, filed on Jul. 16, 2010.

(51) Int. Cl.
*G06F 15/173* (2006.01)

(52) U.S. Cl.
USPC .......................................... 709/223; 709/224

(58) Field of Classification Search
USPC .................................................. 709/223, 224
See application file for complete search history.

(56) References Cited

U.S. PATENT DOCUMENTS

| | | | |
|---|---|---|---|
| 5,860,083 A | 1/1999 | Sukegawa | |
| 6,442,596 B1 * | 8/2002 | Dyer et al. | 709/207 |
| 7,031,339 B1 * | 4/2006 | Accarie | 370/466 |
| 7,287,068 B1 * | 10/2007 | Eriksson et al. | 709/221 |
| 7,836,444 B2 * | 11/2010 | Kim | 717/173 |
| 7,881,745 B1 * | 2/2011 | Rao et al. | 455/551 |
| 8,046,435 B1 * | 10/2011 | Parekh et al. | 709/219 |
| 2002/0152229 A1 | 10/2002 | Peng | |
| 2005/0091226 A1 | 4/2005 | Lin et al. | |
| 2006/0010173 A1 | 1/2006 | Kilday et al. | |
| 2006/0106806 A1 * | 5/2006 | Sperling et al. | 707/10 |
| 2006/0262749 A1 | 11/2006 | Vitanov et al. | |
| 2007/0198698 A1 * | 8/2007 | Boyd et al. | 709/224 |
| 2007/0226334 A1 * | 9/2007 | Aoyagi et al. | 709/224 |
| 2009/0287777 A1 | 11/2009 | Bhogal et al. | |

(Continued)

FOREIGN PATENT DOCUMENTS

EP            1883042 A1     1/2008

OTHER PUBLICATIONS

Examination Report mailed Nov. 30, 2011, in corresponding European patent application No. 10190116.3.

(Continued)

*Primary Examiner* — Brian P Whipple
(74) *Attorney, Agent, or Firm* — Novak Druce Connolly Bove + Quigg LLP

(57) ABSTRACT

A communication device and method are provided for storing and updating file system information for a network resource such as a content server or application server over a wireless connection. Data pertaining to a folder structure or content listing is received at the device and stored in persistent memory. Upon determination that the stored file system information has aged beyond a predetermined threshold and that a last modification time for the network resource is later than a time associated with the first file system information, a request is transmitted over a wireless connection for new file system information for the network resource. The request may be intercepted by a mobile data server that communicates with the network resource to provide the information to the communication device.

19 Claims, 9 Drawing Sheets

U.S. PATENT DOCUMENTS

| | | | | |
|---|---|---|---|---|
| 2010/0094941 A1* | 4/2010 | Kurosawa | | 709/206 |
| 2010/0131926 A1* | 5/2010 | Younce et al. | | 717/122 |
| 2010/0205246 A1* | 8/2010 | Collins | | 709/203 |
| 2010/0262367 A1* | 10/2010 | Riggins et al. | | 701/209 |
| 2010/0285782 A1* | 11/2010 | Boutie et al. | | 455/414.1 |

OTHER PUBLICATIONS

Microsoft, "System Center Mobile Device Manager 2008, A Technical White Paper", http://www.microsoft.com/systemcenter/mobile/evaluation/overview.mspx, accessed May 24, 2011.

Microsoft, "Overview of Mobile Device Manager", Feb. 9, 2009, http://technet.microsoft.com/en-us/library/dd252770.aspx, accessed May 25, 2011.

Microsoft, "Structure of the Offline Files Cache Folder", Article ID: 230739—Last Review: Feb. 27, 2007—Revision: 3.3, http://support.microsoft.com/kb/230739, accessed May 25, 2011.

Cerience Corporation, "RepliGo Server", http://www.cerience.com/products/server, accessed May 27, 2011.

Cerience Corporation, The RepliGo Server document cache database is growing too large, what can I do?, http://www.cerience.com/support/cache-too-large#more-308, accessed May 27, 2011.

Rove Inc., "How much data bandwidth will Mobile Admin use?", http://www.roveit.conn/kb/activekb/questions.php?questionid=3, accessed May 27, 2011.

WICKSoft Corporation, "WICKSoft Mobile Documents™ for the BlackBerry Security white paper—mobile document access for the Enterprise", 2007, http://www.wicksoft.com/pub/wicksoft_mobile_documents_security_white_paper.pdf, accessed May 27, 2011.

LisiSoft.com, "Idokorro Mobile File Manager 2.5", http://www.lisisoft.com/free-download-version/59531-idokorro-mobile-file-manager-2-5.html, accessed Jul. 12, 2010.

Extended European Search Report dated Feb. 24, 2011 from EP 10190116.3.

Sivathanu, G., Zadok, E., "A Versatile Persistent Cashing Framework for File Systems", Computer Science Department, Stony Brook University, NY, Dec. 2005, pp. 1-4, XP002621853, http://www.fsl.cs.sunysb.edu/docs/cachefs-tr/cachefs.pdf, accessed Feb. 25, 2010.

* cited by examiner

```
hal/users/zoidberg 2010-7-16T11:36:09
00010000 Drafts 2007-6-14T23:01:45, 2010-7-12T14:56:02, 2010-7-12T14:58:00 573K
00010000 Great American Novel v.3 2008-1-1T11:03:15, 2008-1-7T20:50:08, 2008-7-7T20:50:08 10K
00010000 Invoices 2005-10-14T13:14:32, 2010-7-12T18:26:56, 2010-7-12T19:05:00 5822K
00010000 Kids 2007-6-15T22:11:41, 2010-7-15T13:11:02, 2010-7-15T13:11:02 10450K
00010000 Movies 2009-3-10T07:51:38, 2010-2-12T11:32:09, 2010-7-12T11:45:00 5.6GB
...
00000000 05notes.txt 2010-6-19T20:41:15, 2010-7-16T11:36:09, 2010-7-17T03:50:00 15KB
00000000 mopopch12_rewrite 2007-6-14T23:01:45, 2009-3-30T14:22:02, 2010-9-01T10:08:00 230KB
```

FIG. 8A

```
<?xml version="1.0" encoding="ISO-8859-1"?>
<folder lastmod="2010-7-16T11:36:09" name="hal/users/zoidberg/"/>
<folder hidden="n" system="n" readonly="n" archive="n" name="Drafts" createdDate="2007-6-14T23:01:45" lastmodDate="2010-7-12T14:56:02" lastaccessDate="2010-7-12T14:58:00" size="573K" />
<folder hidden="n" system="n" readonly="n" archive="n" name="Great American Novel v.3" createdDate="2008-1-1T11:03:15" lastmodDate="2008-1-7T20:50:08" lastaccessDate="2008-7-7T20:50:08" size="10K" />
<folder hidden="n" system="n" readonly="n" archive="n" name="Invoices" createdDate="2005-10-14T13:14:32" lastmodDate="2010-7-12T18:26:56" lastaccessDate="2010-7-12T19:05:00" size="5822K" />

<file hidden="n" system="n" readonly="n" archive="n" name="05notes.txt" createdDate="2010-6-19T20:41:15" lastmodDate="2010-7-16T11:36:09" lastaccessDate="2010-7-17T03:50:00" size="15K" />
<file hidden="n" system="n" readonly="n" archive="n" name="mopopch12_rewrite" createdDate="2007-6-14T23:01:45" lastmodDate="2009-3-30T14:22:02" lastaccessDate="2010-9-01T10:08:00" size="230K" />
</folder>
```

FIG. 8B

PERSISTING FILE SYSTEM INFORMATION ON MOBILE DEVICES

CROSS-REFERENCE TO RELATED APPLICATIONS

This application claims priority to U.S. Provisional Application No. 61/364,883 filed on 16 Jul. 2010, the entirety of which is incorporated herein by reference.

BACKGROUND

1. Technical Field

The present application is directed generally to mobile access to shared resources.

2. Description of the Related Art

Mobile communication devices, such as smartphones, are increasingly used for productivity tasks beyond messaging and voice communication. For example, users may be provided access via their mobile devices and a wireless network to corporate files and applications resident on content and application servers within the corporate local area network. Some communication of data between the mobile device and the corporate LAN, however, may sometimes be subject to delay due to message flow between the mobile device, intermediary components in the corporate LAN, other private or public network components, and the content or application server.

BRIEF DESCRIPTION OF THE DRAWINGS

In drawings which illustrate by way of example only embodiments of the present application.

FIGS. 8A and 8B are illustrations of exemplary file system information.

DETAILED DESCRIPTION

Figure 1:
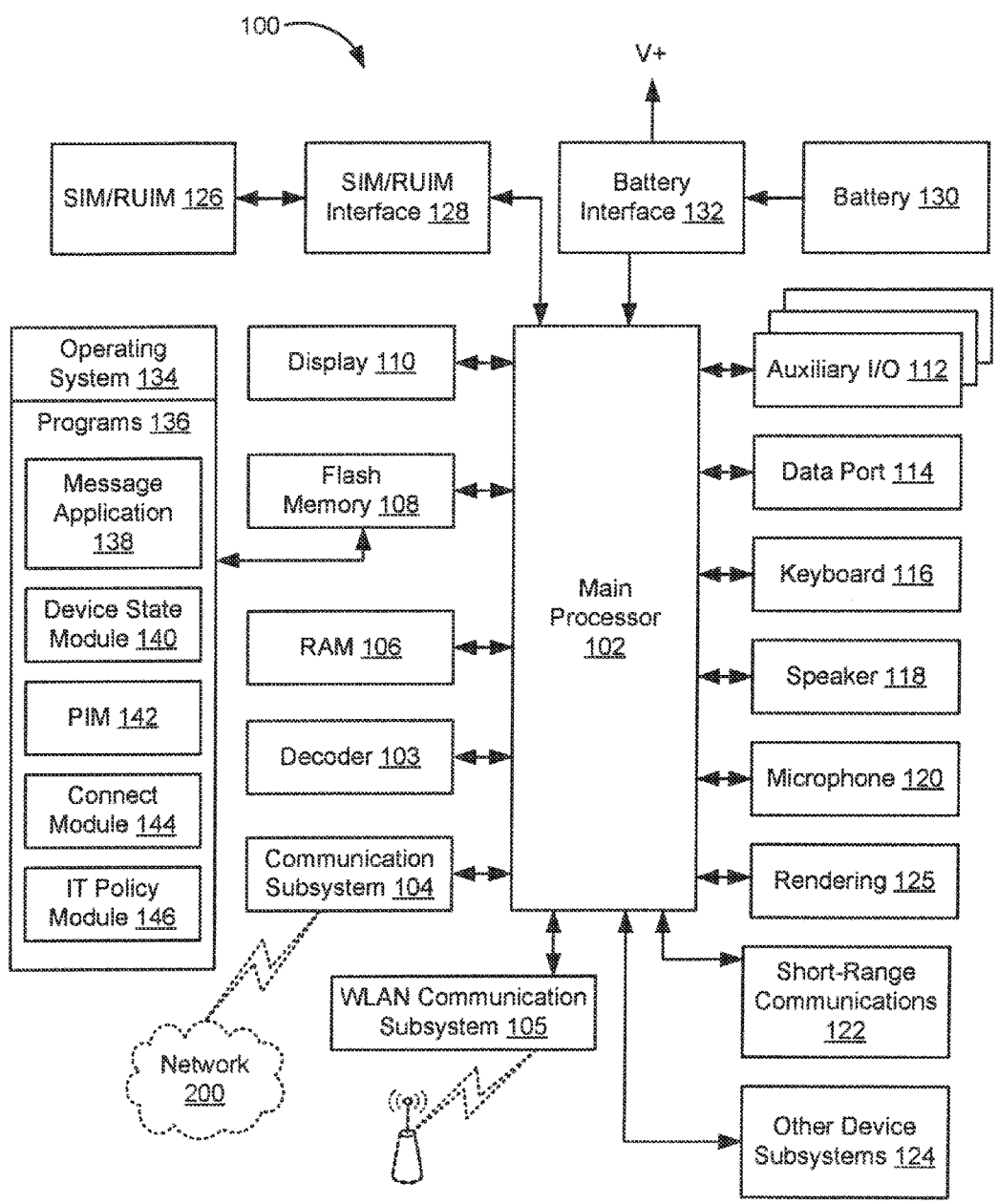
FIG. 1 is a block diagram of an embodiment of a mobile device.

The embodiments described herein provide a system, method, and a mobile device for managing and persisting cached file system information on a mobile communication device, such as a smartphone. These embodiments will be described primarily in relation to a mobile wireless communication device such as a smartphone, hereafter referred to as a communication device. It will be appreciated by those skilled in the art, however, that this description is not intended to limit the scope of the described embodiments to smartphones. The methods and systems described herein may be applied to any appropriate communication or data processing device adapted for communication over a network, whether portable or not and whether adapted for voice communication or not, including without limitation cellular phones, smartphones, wireless organizers, personal digital assistants, desktop computers, terminals, laptops, tablets, handheld wireless communication devices, wirelessly-enabled notebook computers and the like.

The embodiments described herein provide a communication device adapted to store and update file system information for a network resource, the communication device comprising a wireless communication module; a display; a persistent memory; and a processor in communication with the wireless communication module, the display, and the persistent memory, the processor being configured to store, in the persistent memory, data comprising first file system information received via the wireless connection module for the network resource; request, using the wireless connection module, new file system information for the network resource when it is determined that the first file system information has aged beyond a predetermined threshold and that a last modification time for the network resource is later than a time associated with the first file system information; enable receiving data comprising the new file system information using the wireless connection module; and store said data comprising the new file system information in the persistent memory. In a further aspect, the request is carried out in response to a received refresh command.

In a further aspect, the processor is further configured to enable receipt of a request for file system information at the network resource, said request being associated with user credentials, and wherein said user credentials are validated at the network resource prior to said receiving data comprising the new file system information.

In another aspect, the processor is further configured to enable receipt of the last modification time for the network resource and to compare said last modification time with the time associated with the first file system information in response to a received request for file system information.

In still a further aspect, the processor is further configured to enable display of at least a portion of the data comprising the new file system information at the communication device once received, and alternatively or additionally to enable display of at least a portion of the stored data comprising the first file system information if it is determined that either the first file system information has not aged beyond the predetermined threshold or that the last modification time for the network resource is earlier than the time associated with the first file system information.

There is also provided a method for updating, at a communication device, file system information for a network resource, the method comprising storing, in persistent memory at the communication device, data comprising first file system information received over a wireless connection for the network resource; requesting, over the wireless connection, new file system information for the network resource when it is determined that the first file system information has aged beyond a predetermined threshold and that a last modification time for the network resource is later than a time associated with the first file system information; receiving data comprising the new file system information over the wireless connection; and storing said data comprising the new file system information in the persistent memory. In a further aspect, the requesting is carried out in response to a received refresh command.

In a further aspect, said requesting is carried out in response to a request at the communication device for file system information from the network resource, the request being associated with user credentials, and said user credentials are validated at the network resource prior to said receiving data comprising the new file system information.

In still a further aspect, the communication device also receives the last modification time for the network resource and compares said last modification time with the time associated with the first file system information in response to a received request for file system information.

In yet a further aspect, at least a portion of the data comprising the new file system information at the communication device is displayed once received. Alternatively or additionally, at least a portion of the stored data comprising the first file system information is displayed if it is determined that either the first file system information has not aged beyond the predetermined threshold or that the last modification time for the network resource is earlier than the time associated with the first file system information.

In a further aspect of the above device and method, the first file system information and the new file system information comprise at least one of an initial folder structure of the network resource and a content listing of the network resource.

In still a further aspect, the network resource may be one of a content server, a file server, or an application server.

In yet a further aspect, the data comprising the first file system information and the data comprising the new file system information may be received from a mobile data server in communication with the network resource. Further, the mobile data server may receive file system information from the network resource in a first format, and transmit the data comprising the first file system information and the data comprising the new file system information to the communication device in a second format.

There is also provided a computer readable medium comprising code executable by a processing device to carry out the foregoing method and variations.

Figure 2:
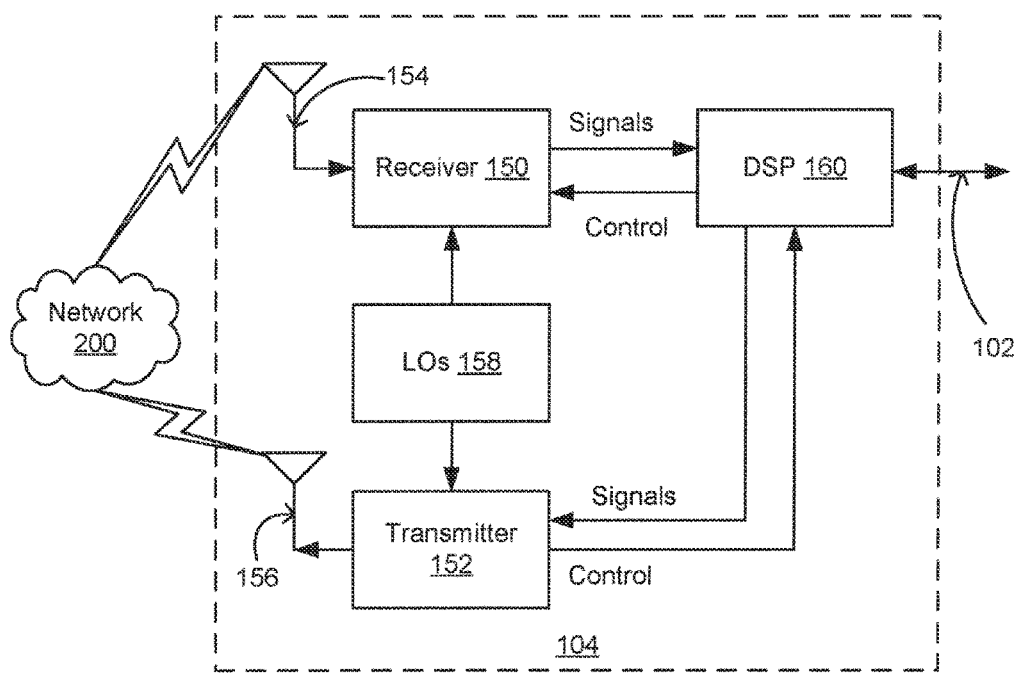
FIG. 2 is a block diagram of an embodiment of a communication subsystem component of the mobile device of FIG. 1.
Figure 3:
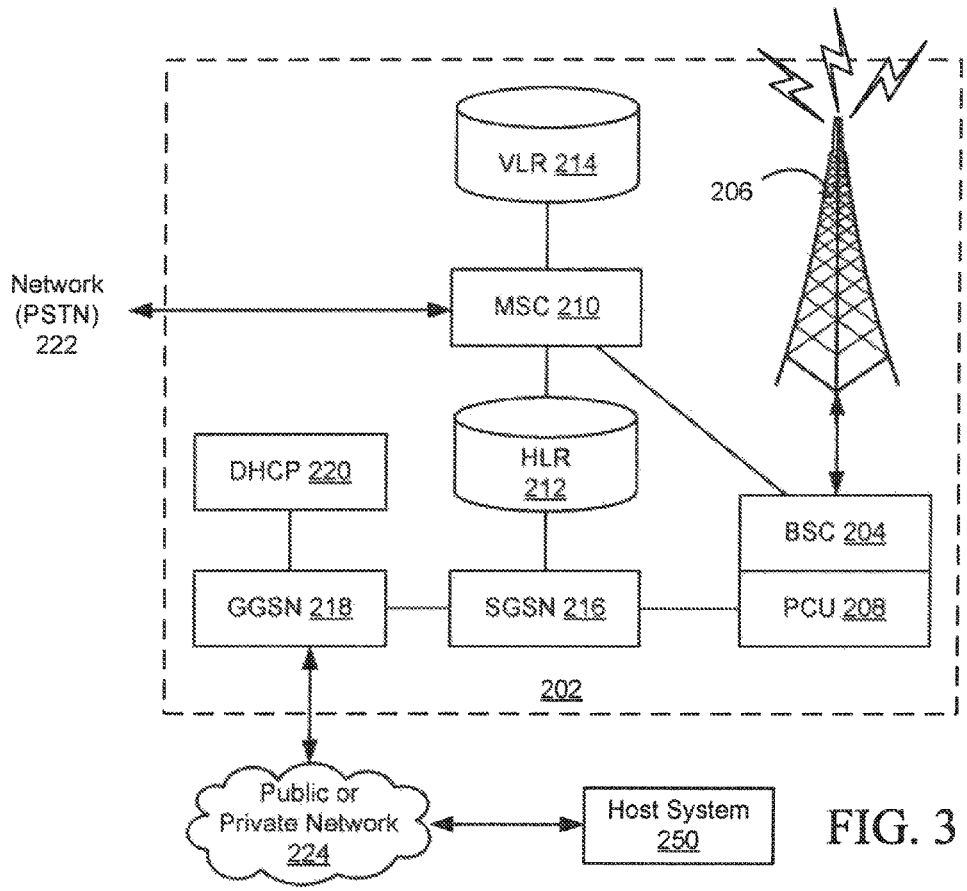
FIG. 3 is an exemplary block diagram of a node of a wireless network for use with the mobile device of FIG. 1.
Figure 4:
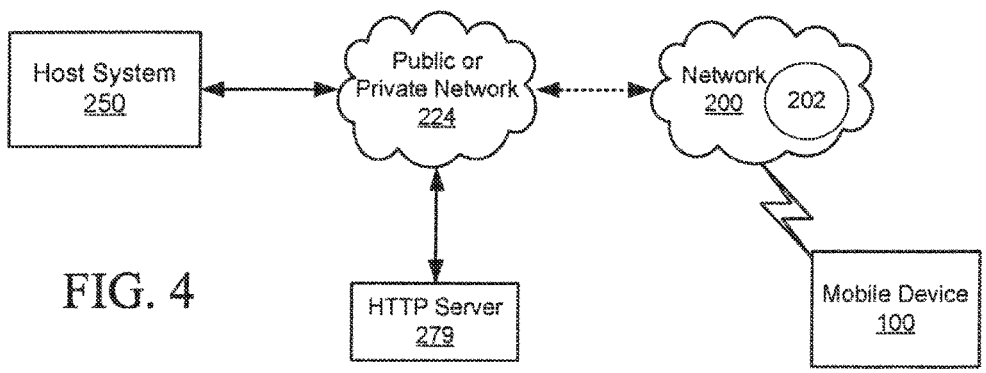
FIG. 4 is a block diagram illustrating a host system in communication with the mobile device of FIG. 1 for use with the wireless network of FIG. 3.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities. Throughout the specification, terms such as "may" and "can" are used interchangeably and use of any particular term should not be construed as limiting the scope or requiring experimentation to implement the claimed subject matter or embodiments described herein.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, the short-range communications 122 and other device subsystems 124.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown), such as a file manager and explorer module. The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods. Other communication subsystems, such as the WLAN communication subsystem 105 shown in FIG. 1, may be provided with similar components as those described above configured for communication over the appropriate frequencies and using the appropriate protocols.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266, shown in FIG. 5. The proxy server 266 provides a secure node and a wireless internet gateway for the host system 250. The proxy server 266 intelligently routes data to the correct destination server within the host system 250.

Figure 5:
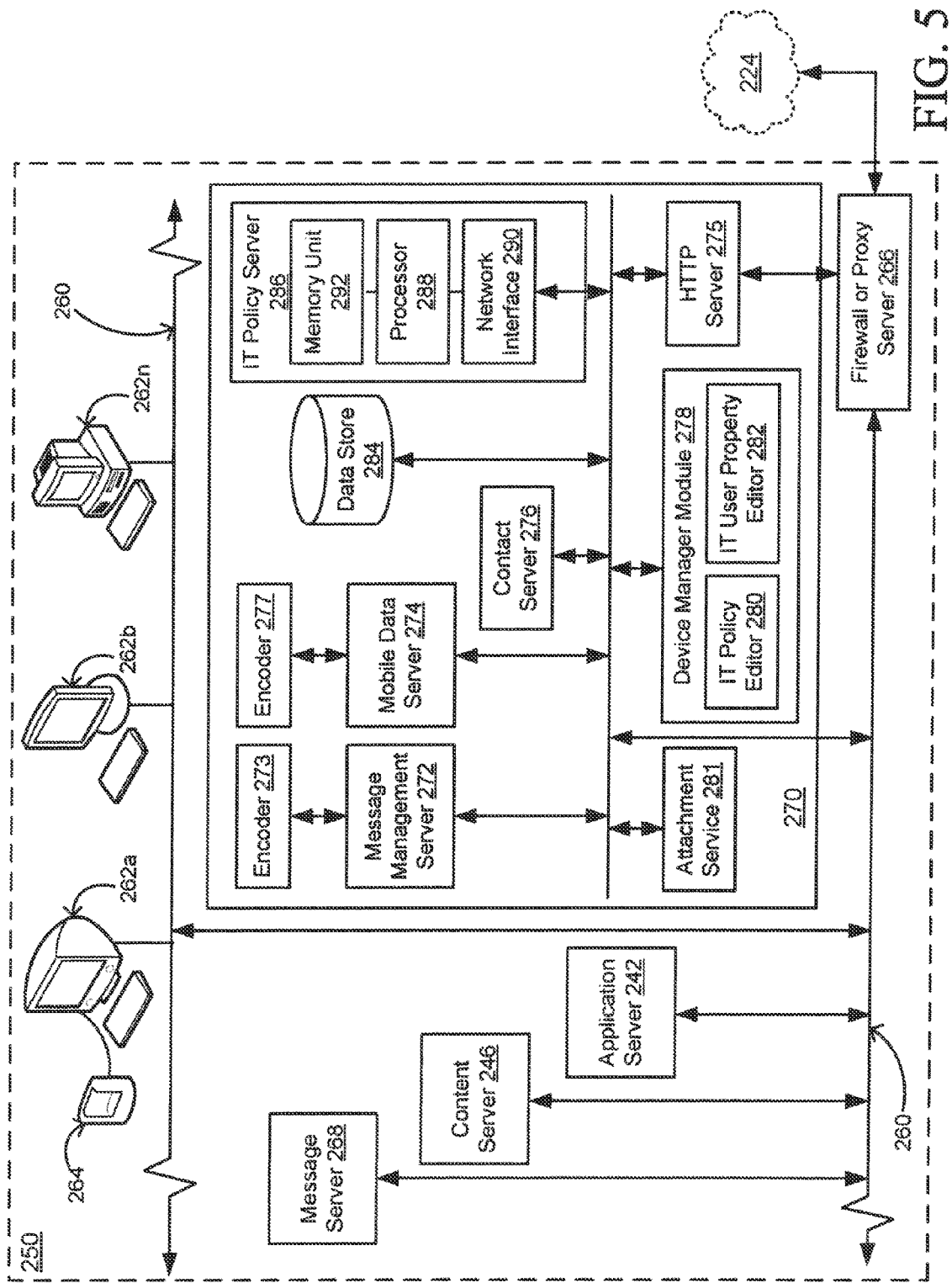
FIG. 5 is a block diagram illustrating components of an exemplary configuration of the host system of FIG. 4.

FIG. 5 is a block diagram illustrating components of an exemplary configuration of the host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 5, the host system 250 is depicted as a LAN of an organization to which a user of the communication device 100 belongs. The host system 250 comprises a number of network components connected to each other by a network 260. For instance, a user's desktop computer 262*a* with an accompanying cradle 264 for the user's communication device 100 is situated on a LAN connection. The cradle 264 for the communication device 100 can be coupled to the computer 262*a* by a serial or a Universal Serial Bus (USB) connection, for example. Other user computers 262*b*-262*n* are also situated on the network 260, and each can be equipped with an accompanying cradle 264. The cradle 264 facilitates the loading of information (e.g. PIM data, private symmetric encryption keys to facilitate secure communications) from the user computer 262*a* to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262*a*-262*n* are typically also connected to other peripheral devices, such as printers, etc., which are not explicitly shown in FIG. 5. Furthermore, only a subset of network components of the host system 250 are shown in FIG. 5 for ease of exposition, and it will be understood by persons skilled in the art that the host system 250 will comprise additional components that are not explicitly shown in FIG. 5 for this exemplary configuration. More generally, the host system 250 can represent a smaller part of a larger network (not shown) of the organization, and can comprise different components and/or be arranged in different topologies than that shown in the exemplary embodiment of FIG. 5.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. An attachment service 281 may be provided for converting message attachments to formats optimized for viewing on the communication device 100. Those skilled in the art will know how to implement these various components. Other components can also be included as is well known to those skilled in the art. Further, in some implementations, the data store 284 can be part of any one of the servers.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection may be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262*b* within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262*a* can request the e-mail messages associated with that user's account stored on the data store associated with the message server 268. These messages are then retrieved from the data store and stored locally on the computer 262*a*. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications, although such applications and their data repositories may exist outside the mobile data server 274. The mobile data server 274 can also connect to the Internet or other public network, through HTTP server 275 or other suitable web server such as a File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274.

Similarly, the communication device 100 may be configured to permit access to network shares and other resources within the host system 250, such as the content or file server 246 or application server 242 illustrated in FIG. 5, via the mobile data server 274. For ease of reference a content or file server is used as an example of a network resource in this description. Requests for files from the communication device 100 may be routed through the mobile data server 274 to the appropriate server 242, 246, with the mobile data server 274 initiating an appropriate data transfer protocol session on behalf of the device 100. Each user may be associated with an account provided with access to a file repository on the content or file server 246 or to applications served from the application server 242. Content or applications may be associated with suitable permissions to provide the user to access the files, which may be defined using the device manager module 278. Thus, the user may be required to provide credentials prior to being granted access to the network resource. These credentials may be entered at the communication device 100 and transmitted via the mobile data server 274 to the resource 242, 246 for validation. Network shares to be made available to the communication device 100 may be identified by service URL and associated with one or more user in the device manager module 278. A user interface element corresponding to the service entry point for the file manager or other application for accessing the network share may then be defined at the communication device 100. In this manner, network resources may be accessed from the communication device 100 without requiring a separate VPN connection via a host system 250 access point, or via a VPN connection from a remote access point to the host system 250 over a public network.

As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284, the attachment service 281 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, network shares, security requirements (e.g. encryption algorithms, password rules, etc.), specifying themes or applications that are allowed to run on the communication device 100, and the like.

As noted above, access to network resources such as application servers 242 and content servers 246 within the host system 250 may be provided at the communication device 100, thus enabling a user to browse and access files stored in the corporate network. The user, at the communication device 100, may input a command to retrieve content from the content or file server 246 within the corporate LAN. The communication device 100 then transmits a request for the data to the host system 250. The request is forwarded to the mobile data server 274, which may then create an HTTP session (or a session using another suitable protocol) to request and retrieve the requested content from the server 246. Upon receipt of the requested content, the mobile data server 274 may then convert the content to a format that is renderable or easily parsed at the communication device 100 prior to transmitting the content to the device 100. Also as noted above, the mobile data server 274 may also compress or encrypt the data to be transmitted to the device 100. The communication device 100 may then transmit an acknowledgment to the host system 250 upon receipt of the content.

An application or other utility for or having the capability of browsing a network resource, such as a file management application, file viewer, messaging application, and the like may be provided on the communication device. This application may permit the user to browse content on the file server 246 or other network resource via a user interface, including a visual, text-based or graphics-based user interface, and to manipulate using the communication device 100 content stored on the content server 246. The application thus requires file system information to be provided by the content server 246 to the communication device 100. Thus, with reference to FIG. 6, a simplified illustration of message and data flow between the communication device 100, the mobile data server 274, and the content or file server 246 is shown. An initial request 300 is transmitted from the communication device 100 to the mobile data server 274. This request may be generated at the communication device 100 in response to a command received via a user interface, for example a command to browse through the directory structure of the content server 246. The initial request 300 may thus comprise a request for an initial folder structure and content listing from the content server 246.

Figure 6:
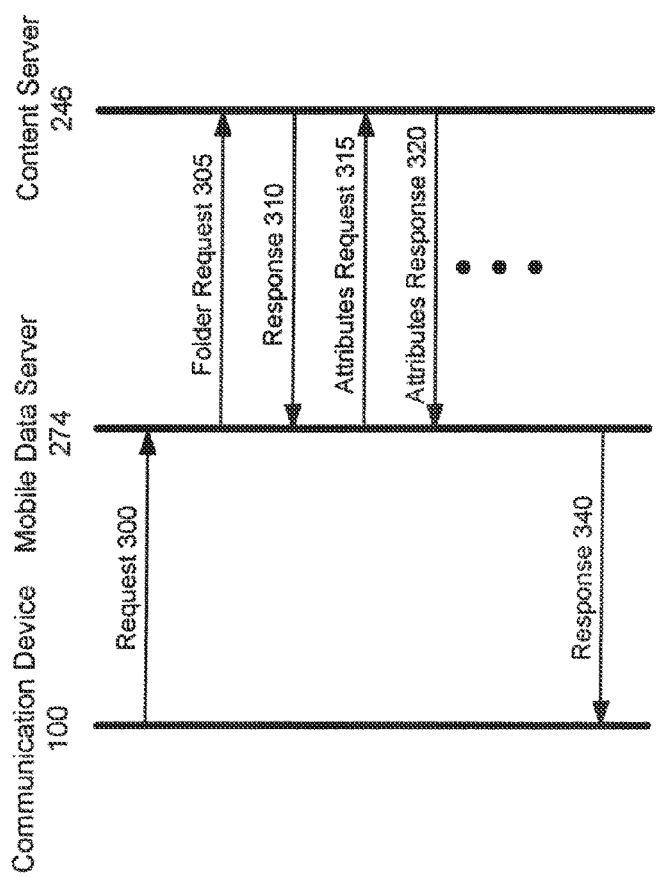
FIG. 6 is a schematic diagram illustrating communication flow between the mobile device of FIG. 1 and a mobile data server and content server of the host system of FIG. 5.

The request is received at the mobile data server 274 via the firewall or proxy server 266 and through other components of the host system 250, not shown in FIG. 6. The mobile data server 274, on behalf of the communication device 100, then initiates a session with the appropriate content server 246 to request the information sought. The mobile data server 274 thus operates like a gateway for the communication device 100. The initial request 305 transmitted from the mobile data server 274 to the content server 246 may comprise a request for initial file system information. For example, if the initial request identified a folder, the request 305 may be an initial query to determine that the folder does in fact exist on the content server 246. A response to this initial request is received as response 310. The mobile data server 274 may then request folder details 315, such information concerning the folder's attributes, a contents listing for the folder, and the like. The content server 246 then responds with the further requested information 320. It will be appreciated by those skilled in the art that the requests and responses between the mobile data server 274 and the content server 246 may be executed according to any suitable protocol, and that the format of responses from the content server 246 may take any variety of appropriate formats.

Figure 7:
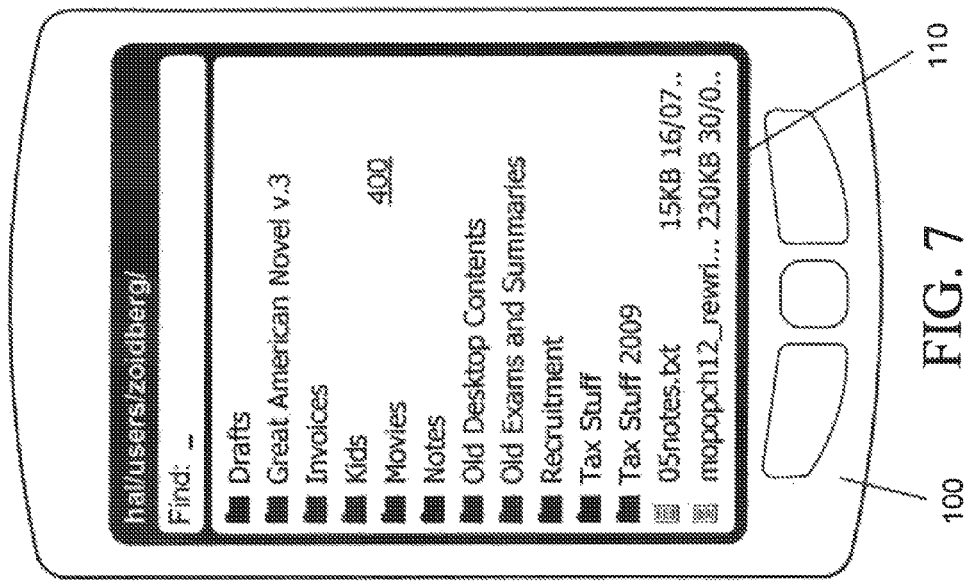
FIG. 7 is an illustration of an exemplary graphical user interface on the mobile device of FIG. 1.

The mobile data server 274 may then aggregate, filter, and/or convert the file system information to a format that can be processed by the communication device 100. For example, the mobile data server 274 may convert the file system information to an XML format. The converted data is then transmitted to the communication device 100 in a response 340. An example of the file system information as it may be displayed at the communication device 100 is shown in user interface 400 of FIG. 7. FIG. 7 illustrates a list of contents in a network share identified by the path "hal/users/zoidberg", and including both folders and files, together with at least some metadata such as size or last modified date. The file system information can be displayed to the user in a file picker user interface, such as that shown in FIG. 7. The file picker user interface permits a user to browse through and select one or more files listed in the user interface.

An example of file system information that may be received by the mobile data server 274 from the content server 246 is shown in FIG. 8A. For convenience, the information is depicted in an easily human-readable flat file, text form to illustrate that the file system information delivered to the mobile data server 274 in response to the requests may include the last modified date for the network share represented by the specified path; attribute information for each file or folder found in the network share or subdirectory thereof, such as hidden, read-only, system, and archive attributes, as well as optional ownership and permissions information for the user, group, and the public; created, last modified, and last accessed dates (shown in that order in FIG. 8A); and file size. Other attributes or metadata may also be included in the information provided by the content server 246 to the mobile data server 274. FIG. 8B illustrates an example of XML-type data that may be generated by the mobile data server 274 for provision to the communication device. The XML file may comprise substantially all of the same information provided by the content server 246. Conversion of the flat-file information to XML will be understood by those skilled in the art.

Thus, in response to the initial request transmitted from the communication device 100, the host system 250 generates a response for transmission to the communication device 100 comprising the requested file system information. In the example described above, the mobile data server 274 obtains file system information from the content server 246 or other target server, and generates a new file comprising the requested file system information. The new file, intended for delivery to the communication device 100, can be in the XML format described above, or in another appropriate format for presentation and storage at the device 100. The selection of format may depend on the data store at the communication device 100 used to store the received file. For example, storage in a record store in non-volatile memory at the device may require the file system information to be serialized in a byte array format, whereas if the information is stored in a persistent store allowing for file storage, no additional conversion or formatting may be necessary. In some embodiments, the conversion to a format storable and readable at the communication device 100 is therefore carried out at the device 100 rather than at the mobile data server 274. Regardless of the specific format of the data store at the device 100, the file system information can be made available to other applications executable at the device 100.

It can be seen for a single request for file system information transmitted from the device 100, a number of steps may be carried out by the mobile data server 274, content server 246, and other components of the host system 250 prior to a response being received by the device 100. There may be a number of request-response communications between the content server 246 and the mobile data server 274 before the response 340 is constructed for the communication device 100. A number of these steps may contribute to delay in the communication device 100 displaying the requested file system information to the user after receipt of the original command to view a folder's contents. Accordingly, the file system information received at the device 100 may be cached for subsequent reuse, for example to populate a further file picker user interface for presentation to the user. However, if the cached data is associated specifically with that instance of the application, upon exiting the file manager application or other application that was executing at the device 100 and accessing the file system information, the cached information may be deleted, particularly if the information is stored only in a runtime data store. As a result, the next time the same command is invoked—for example, if the user wishes to view the same folder contents again, or if another application invoked at the device attempts to access the same folder content information—the communication device 100, mobile data server 274 and the content server 246 must engage in the same steps, potentially creating further delay at the communication device in responding to user commands.

Accordingly, upon receipt of file system information from the mobile data server 274, the communication device 100 instead caches the data in non-volatile memory, such as flash memory 108, and persists this cached information across both instances of the same application, as well as across different applications. Further, by storing the data in non-volatile memory, the cached information can survive resets or power outages at the device 100. To maintain the currency of the data, the communication device 100 may be configured to refresh the cached information in accordance with specific rules implemented at the device 100. In cases where the cached information is presented to the user, a selectable menu option or command may be made available via a user interface to permit the user to override use of the cached information, and to force the device 100 to request updated file system information form the host system 250. For example, if the user knows that the directory on the network share at the content server 246 may have been changed, but the file system information displayed at the device 100 does not reflect the expected changes, the user may then force an update of the file system information at the device 100 by initiating a "refresh" command. Relying on the cached information in this manner reduces the number of requests transmitted from the device 100 to the host system 250, thus reducing latency in responding to a command at the device 100 to display file system information from the content server 246.

Figure 9:
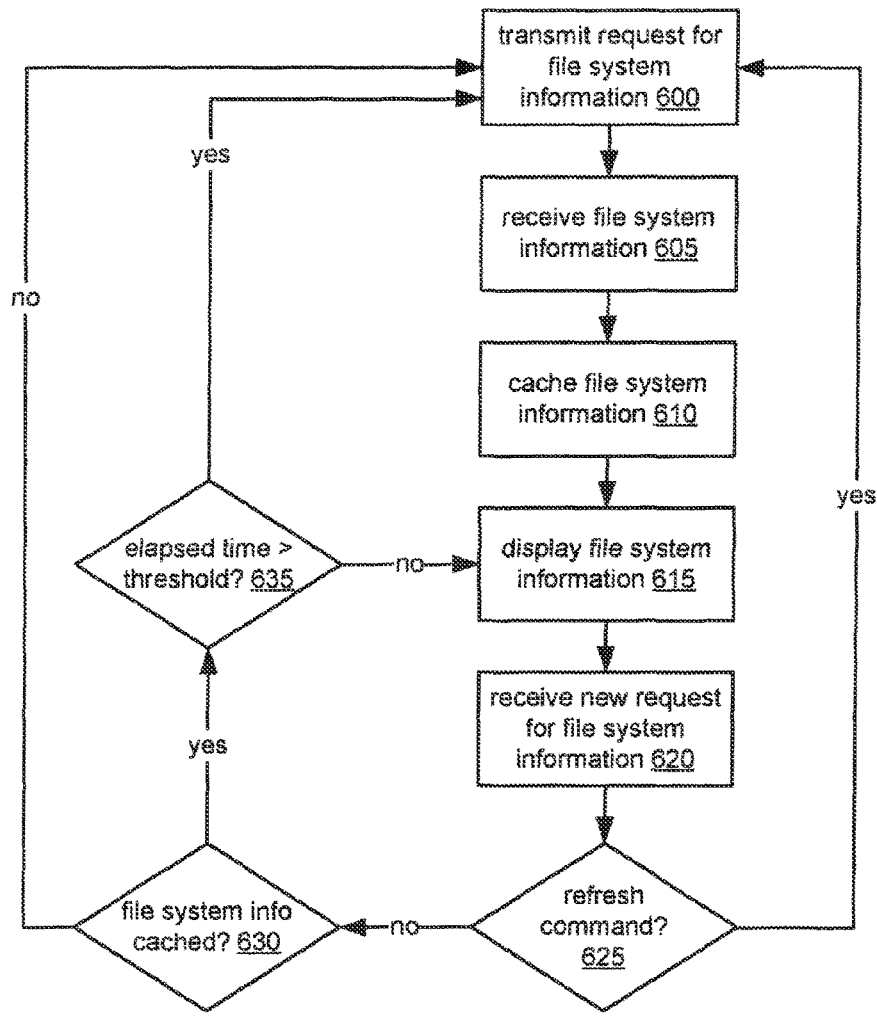
FIG. 9 is a flowchart illustrating a process for updating and persisting cached file system information.

A simple example is illustrated in FIG. 9. At 600, a request for file system information for an identified folder or directory is transmitted from the communication device 100. This request, as noted above, may be initiated in response to a received command at the device 100, for example by a file manager application. The instruction to retrieve file system information may be invoked in other contexts, such as productivity, messaging or entertainment applications invoking a file picker user interface to permit the user to select files to open, edit, or attach to messages. At 605, the file system information is received from the host system 250, and may be in a format converted by the mobile data server 274. At 610, the received information is cached in non-volatile memory at the communication device 100 in association with a timestamp indicating the time of the caching. It may also be displayed at the communication device's display 110 at 615, although display of the file or directory listing may not be required depending on the purpose for which the information is retrieved (for example, if the application uses the file system information in order to execute a search of the file or directory listing on the communication device 100, display of the received listing is not necessary). The timestamp associated with the received file system information may be a timestamp assigned by the communication device 100 upon receipt of the file. In other embodiments, the timestamp may be generated at the host system 250, and specifically by the mobile data server 274 in this example. If it is not generated or assigned at the communication device 100, the timestamp can either be comprised within the file system information file transmitted to the communication device 100, or transmitted separately. The timestamp may be stored with or separately from the file system information in the non-volatile memory. The timestamp can be represented by a numeric or alphanumeric string or in any other suitable data format, and as used herein, includes datestamps, times, dates, or other indicators of a relative age of the data. Subsequently, the communication device 100 receives a further request for the same file system information at 620. This request may be received during the same session or instance of the file manager application. Alternatively, it may be received from another application executing on the device 100, such as a messaging application. The messaging application may permit the user to attach files stored in the network share rather than at the device 100. Accordingly, the messaging application can include an interface that permits the user to connect to the network share, browse the files therein, and select a file for attachment. The message, together with an identifier of the file selected as an attachment, can then be transmitted from the device 100 without attachment to the host system 250, where the message may be altered to attach the specified file. In this manner, bandwidth is not consumed in retrieving the file from the network share and transmitting it again from the device 100.

Upon receipt of the new request at 620, the communication device 100 then determines at 625 whether the request is a request to refresh the cache information already present at the device 100. If it is, then the process returns to 600, and a request for file system information is transmitted to the host system 250. If the request is not a refresh instruction, then at 630 the device 100 determines whether the requested file system information was cached. If it was not, then the device 100 must transmit a request for the file system information, and the process returns to 600. If, however, the requested information was already cached at the device, then at 635 the device 100 determines whether the cached information has aged beyond a specified threshold. The threshold age may be specified at the communication device 100 itself, or in an IT policy configured at the host system 250 and pushed to the device 100. For a network share whose contents may be altered reasonably frequently, the default threshold time may be set at 10 minutes. Thus, at 635, the device 100 determines whether the difference between the current time and the timestamp stored with the cached information exceeds the threshold. If it does, then again the process reverts to 600, and new file system information is requested. If the cached information is newer than the specified threshold, then the cached information may be displayed at 615. Thus, a balance can be struck between freshness of the cached information and the delay incurred by refreshing the cached information, as well as the consumption of device resources (such as battery life and bandwidth).

Figure 11:
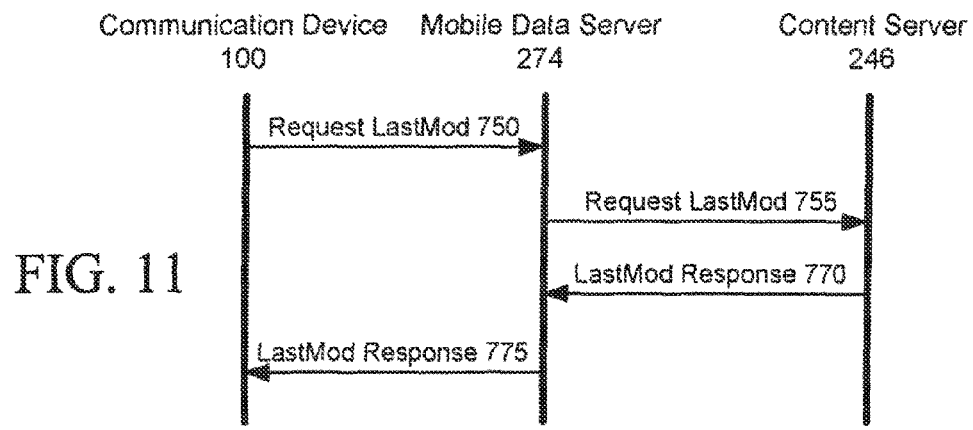
FIG. 11 is a further schematic diagram of communication flow between the mobile device of FIG. 1, and the mobile data server and content server of the host system of FIG. 5.
Figure 10:
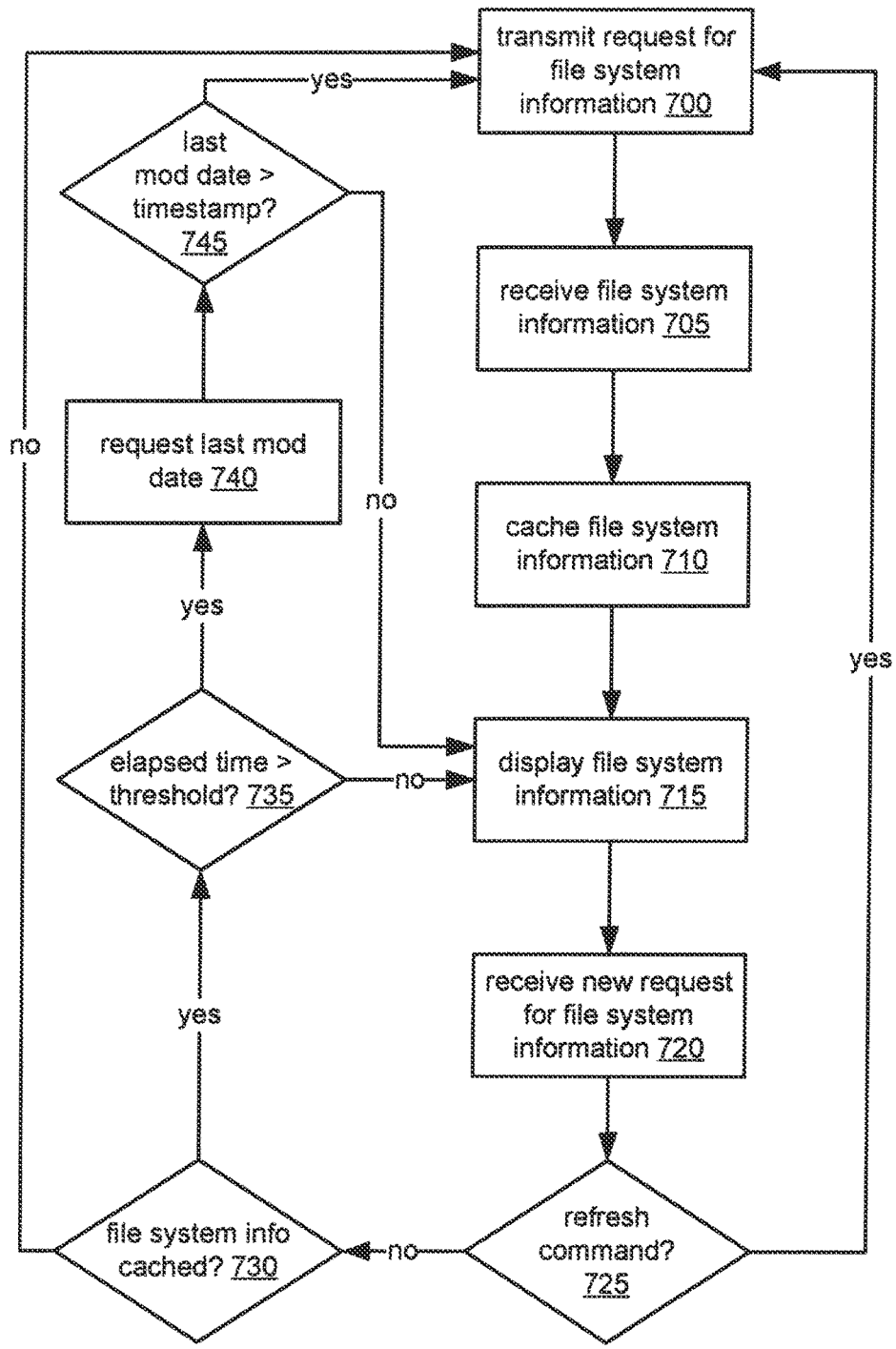
FIG. 10 is a flowchart illustrating a further process for updating and persisting cached file system information.

In a further embodiment, the device 100 can proactively determine whether the folder of interest at the network share has been modified since the last caching. In FIG. 10, at 700 the request for file system information is transmitted from the communication device 100 to the host system 250. At 705, the device 100 receives the requested information in a file from the host system 250. At 710, the device 100 then caches the file system information as described above, in non-volatile memory, in association with a timestamp. Again, the device 100 may display the received file system information at 715. At 720, when a new request for the file system information is received, the device 100 again determines whether the request is a refresh instruction at 725. If the instruction is a refresh instruction, the cache is skipped and the process returns to 700 to request new file system information from the host system 250. If it is not, the device 100 then determines whether the file system information is already cached in the non-volatile memory at 730, and if it is not, the process returns to 700 where the information is requested. If the information is already cached, then at 735 the device 100 determines whether the cached information has aged beyond a predetermined threshold, for example if the difference between the current time and the timestamp stored with the cached information exceeds a predetermined threshold. If it does not, then the currently cached file system information is displayed at 715. If the cached information has aged beyond the predetermined threshold, then the device 100 transmits a request to the host system 250 for the last modification date of the particular folder in the network share for which the request was received at 740. Once the response is received, if the device 100 determines at 745 that the last modified date or time associated with the folder is later than the timestamp associated with the cached data, then the process returns to 700, and new file system information is requested since it is presumed that the currently cached data is out of date. Thus, to determine whether the cached information should be refreshed, a comparison is made of the last modification date or time of the source information—the folder on the network share on the content server 246 or other network resource—and the timestamp associated with the file generated by the mobile data server 274 and cached at the communication device 100 (or generated and cached at the communication device 100). An example of the message flow between the communication device 100, the mobile data server 274, and the content server 246 in obtaining the last modification date is shown in FIG. 11. During block 740, the communication device 100 transmits a request 750 for the last modified date of the identified folder to the host system 250. The mobile data server 274, on behalf of the device 100, transmits a request 755 for the last modified date to the content server 246. The content server 246 responds with the last modified date 770. The mobile data server 274 then forwards a response with the last modified date information 775 to the communication device 100, optionally formatting and encoding the response for receipt and processing by the communication device.

Returning to FIG. 10, if the last modified date is earlier than or the same as the cache timestamp, then the device 100 may proceed to display the cached information at 715. As explained above, the user may be required to supply credentials prior to accessing the contents of the server 246. Accordingly, each request for file system information 700 may require the device 100 to tender credentials on behalf of the user for validation by the host system 250. By requiring that a new request for the file system information be made upon expiry of the threshold time, the communication device 100 and host system 250 ensure that the requestor of the file system info continues to be authorized.

Figure 12:
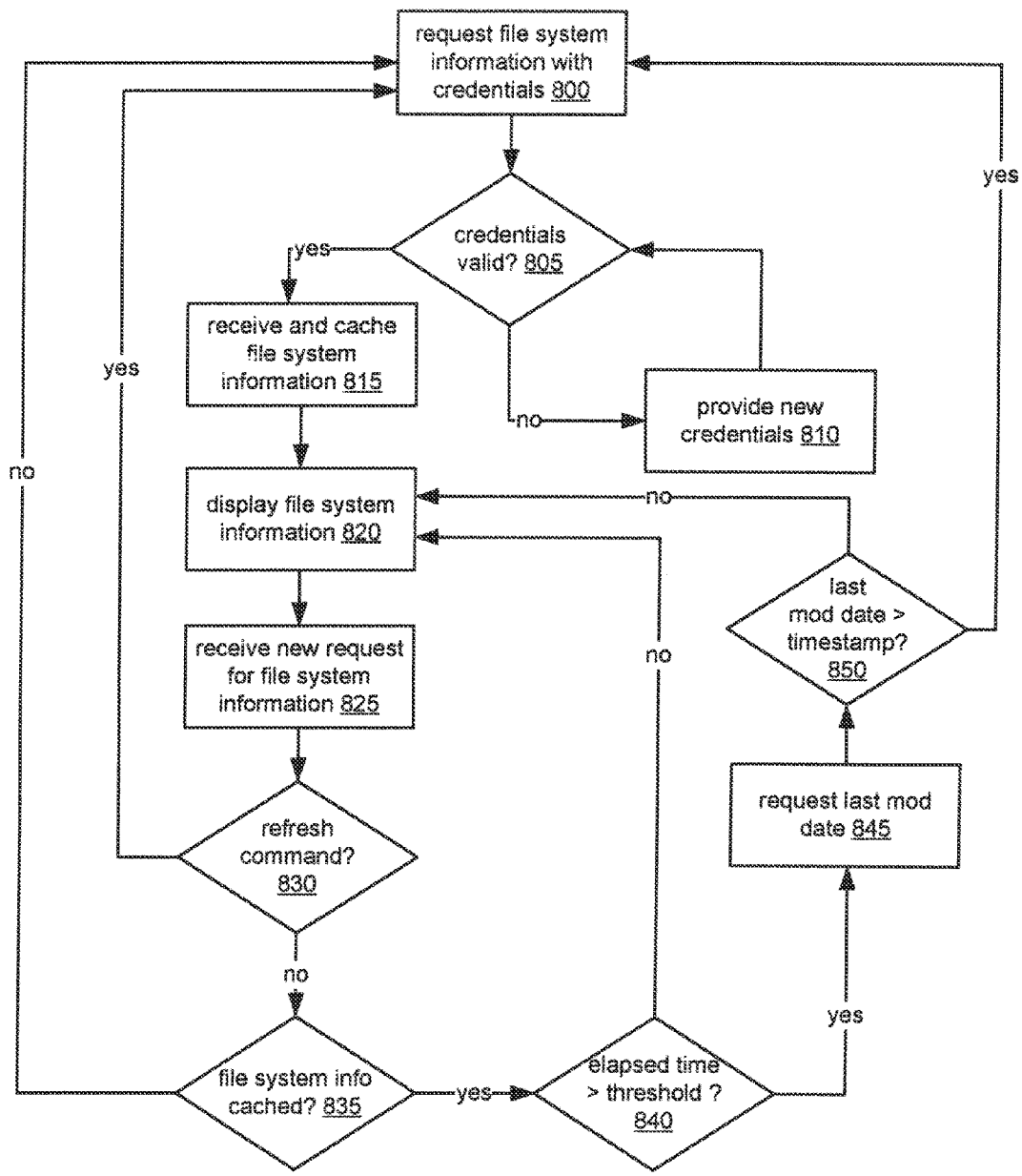
FIG. 12 is a further flowchart illustrating a further process for updating and persisting cached file system information.

A further embodiment of the process using credentials is illustrated in FIG. 12. At 800, a request is transmitted for file system information from the communication device 100. This request may include the user's credentials, such as a password. The password may be entered by the user in response to a prompt upon receipt of the command to view the contents of the network share. In other embodiments, the user may not be required to enter the password or other credential each time the request is made at 700. In some cases, the credentials may be obtained automatically by the device, for example from a smart card in wireless or fixed communication with the communication device 100, or from cached information at the device 100. While it may not be desirable for the user password to be cached at the device 100, in some cases the password may be stored in a hashed or other obfuscated format, or an authorization ticket or other token may be stored at the device for use in place of user-entered credentials. The hashed or obfuscated password, or the authorization ticket or token, may be stored in volatile rather than non-volatile memory, and not persisted across device resets.

At 805, it is determined whether the credentials are valid. This validity check may be performed at the host system 250. If the credentials are not valid, a rejection response is transmitted to the communication device 100, and the user may be prompted to provide new credentials at 810. Otherwise, if the credentials are valid, the file system information is obtained by the mobile data server 274 as described above, and transmitted to the communication device 100. At 815, the information is received and cached in association with the timestamp, as described above. At 820 the information may be displayed at a display on the device 100. At 825, the device 100 receives a new request to retrieve the file system information, and again at 830, determines whether the request is a refresh command, in which case the cache is skipped and the process returns to 800. Otherwise, the device 100 determines at 835 whether the information is already cached. If it is not, then the process returns to 800, where the file system information is requested of the host system 250 using the user's current credentials. If the information is already cached, then at 840 a determination is made whether the threshold time period has elapsed since the information was cached. If the cache had aged beyond the predetermined threshold, then the process returns to 800, where a new request is made for the information with the current credentials. If the cache has not aged past the threshold, then the cached information may be displayed immediately at 820. If the cache has aged past the threshold, then at 845 the last modified date of the folder is requested from the host system 250. If it is then determined at 850 that the last modified date is later than the timestamp of the cached file system information file, then once again the process returns to 800. If the last modified date is earlier than or the same as the cache timestamp, then the cached information is retrieved and displayed at 820. Thus, in addition to balancing delay and the consumption of device resources with the need to maintain a current cache, the process ensures that the applications or users accessing the cached network share information are likely authorized (i.e. were authorized within the threshold period), thus reducing the likelihood that unauthorized access to the cached information stored at the device 100 will be granted.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. It will also be appreciated that although the embodiments herein have been directed generally to file system information and directory structures, similar systems and methods may be carried out in respect of other types of data.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A communication device adapted to store and update file system information for a network resource, the communication device comprising:
    a wireless communication module;
    a display;
    a persistent memory; and
    a processor in communication with the wireless communication module, the display, and the persistent memory, the processor being configured to:
        store, in the persistent memory, data comprising first file system information received via the wireless connection module for the network resource;
        request, using the wireless connection module, new file system information for the network resource when it is determined that the first file system information has aged beyond a predetermined threshold and that a last modification time for the network resource is later than a time associated with the first file system information;
        enable receiving data comprising the new file system information using the wireless connection module;
        store said data comprising the new file system information in the persistent memory; and
        enable display of at least a portion of the stored data comprising the first file system information when it is determined that a condition has been met, the condition being selected from: the first file system information has not aged beyond the predetermined threshold, and the last modification time for the network resource being earlier than the time associated with the first file system information.

2. The communication device of claim 1, wherein the first file system information and the new file system information comprise an initial folder structure of the network resource.

3. The communication device of claim 1, wherein the network resource comprises one of a content server, a file server, or an application server.

4. The communication device of claim 1, wherein the data comprising the first file system information and the data comprising the new file system information are received from a mobile data server in communication with the network resource.

5. The communication device of claim 4, wherein the mobile data server receives file system information from the network resource in a first format, and transmits the data comprising the first file system information and the data comprising the new file system information to the communication device in a second format.

6. The communication device of claim 1, wherein the processor is further configured to enable receipt of a request for file system information at the network resource, said request being associated with user credentials, and wherein said user credentials are validated at the network resource prior to said receiving data comprising the new file system information.

7. The communication device of claim 1, wherein the processor is further configured to enable receipt of the last modification time for the network resource and to compare said last modification time with the time associated with the first file system information in response to a received request for file system information.

8. The communication device of claim 1, wherein the processor is further configured to enable display of at least a portion of the data comprising the new file system information at the communication device once received.

9. The communication device of claim 1, wherein the processor is further configured to carry out said requesting in response to a received refresh command.

10. A method for updating, at a communication device, file system information for a network resource, the method comprising:
- storing, in persistent memory at the communication device, data comprising first file system information received over a wireless connection for the network resource;
- requesting, over the wireless connection, new file system information for the network resource when it is determined that the first file system information has aged beyond a predetermined threshold and that a last modification time for the network resource is later than a time associated with the first file system information;
- receiving data comprising the new file system information over the wireless connection;
- storing said data comprising the new file system information in the persistent memory; and
- displaying at least a portion of the stored data comprising the first file system information when it is determined that a condition has been met, the condition being selected from: the first file system information has not aged beyond the predetermined threshold, and the last modification time for the network resource is earlier than the time associated with the first file system information.

11. The method of claim 10, wherein the first file system information and the new file system information comprise an initial folder structure of the network resource.

12. The method of claim 10, wherein the network resource comprises one of a content server, a file server, or an application server.

13. The method of claim 10, wherein the data comprising the first file system information and the data comprising the new file system information are received from a mobile data server in communication with the network resource.

14. The method of claim 13, wherein the mobile data server receives file system information from the network resource in a first format, and transmits the data comprising the first file system information and the data comprising the new file system information to the communication device in a second format.

15. The method of claim 10, wherein said requesting is carried out in response to a request at the communication device for file system information from the network resource, the request being associated with user credentials, and wherein said user credentials are validated at the network resource prior to said receiving data comprising the new file system information.

16. The method of claim 10, further comprising receiving the last modification time for the network resource and comparing said last modification time with the time associated with the first file system information in response to a received request for file system information.

17. The method of claim 10, further comprising displaying at least a portion of the data comprising the new file system information at the communication device once received.

18. The method of claim 10, wherein said requesting is carried out in response to a received refresh command.

19. A non-transitory computer readable medium comprising code executable by a processing device to carry out the method of:
- storing, in persistent memory at the communication device, data comprising first file system information received over a wireless connection for the network resource;
- requesting, over the wireless connection, new file system information for the network resource when it is determined that the first file system information has aged beyond a predetermined threshold and that a last modification time for the network resource is later than a time associated with the first file system information;
- receiving data comprising the new file system information over the wireless connection;
- storing said data comprising the new file system information in the persistent memory; and
- displaying at least a portion of the stored data comprising the first file system information when it is determined that a condition has been met, the condition being selected from: the first file system information has not aged beyond the predetermined threshold, and the last modification time for the network resource is earlier than the time associated with the first file system information.

* * * * *